July 13, 1926.
J. GLADYSZ
GRASS CUTTER
Filed Dec. 23, 1924
1,592,198
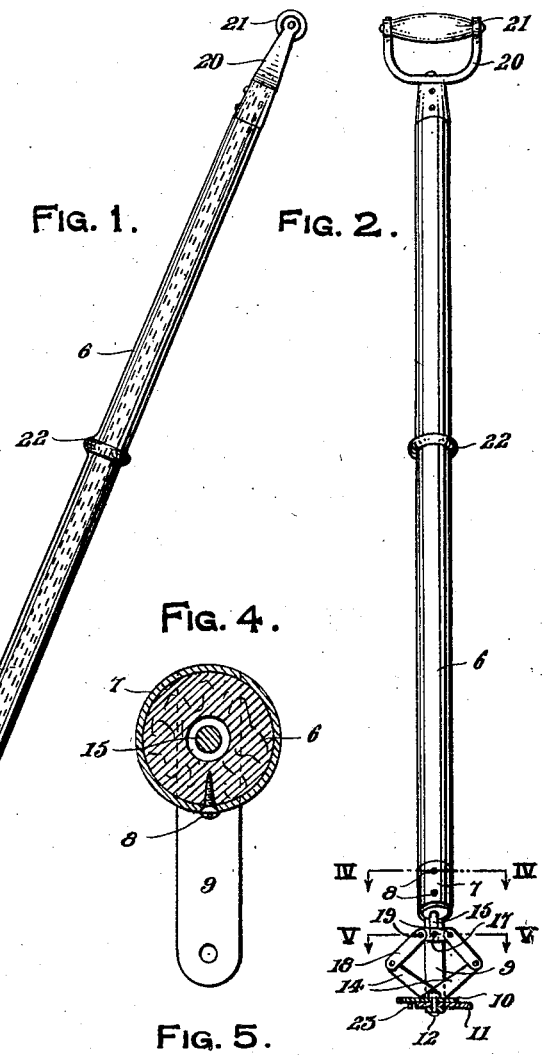
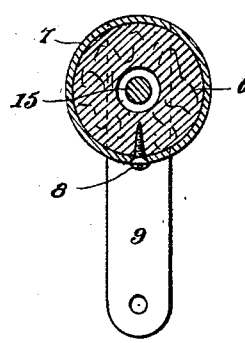
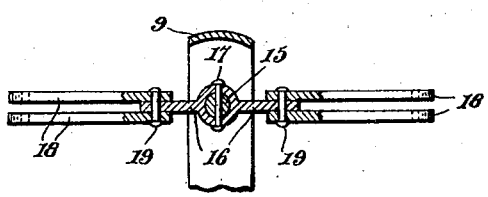
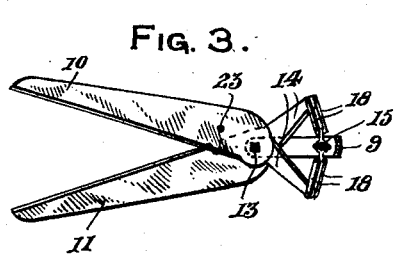
Inventor
J. Gladysz
By Bryant & Lowry
Attorneys Patented July 13, 1926.

1,592,198

UNITED STATES PATENT OFFICE.

JOSEPH GLADYSZ, OF BINGHAMTON, NEW YORK, ASSIGNOR OF THIRTY PER CENT TO ADOLF LESZKOWICZ, OF BINGHAMTON, NEW YORK.

GRASS CUTTER.

Application filed December 23, 1924. Serial No. 757,712.

This invention relates to improvements in grass cutters.

The object of this invention is to provide a device of the above mentioned character adapted to cut or trim grass without the necessity of the operator bending his body to a stooped position.

Another object of this invention is to provied a device of the above mentioned character, adapted to cut or trim grass, in a more simple and easy manner and requiring a smaller period of time by the operator to accomplish the same.

Other objects and advantages of the invention will be apparent during the course of the following description.

In the accompanying drawing forming a part of this specification, and in which like numerals are employed to designate like parts throughout the same, Figure 1 is a side elevation of the device, Figure 2 is a front elevation of the same, Figure 3 is a plan view, partly in section taken on line III—III of Fig. 1, Figure 4 is a sectional view taken on line IV—IV of Fig. 2, and Figure 5 is a sectional view taken on line V—V of Fig. 2, showing the manner in which the cross bar is attached to the reciprocating rod.

In the drawing, wherein for the purpose of illustration is shown a preferred embodiment of my invention, the numeral 6, designates a tubular handle having a ferrule 7, attached thereto by means of screws 8. Formed on the ferrule 7 is an angle bracket support 9 that extends for a distance in alinement with the handle with the terminal end angularly directed and disposed beneath the lower end of the tubular handle.

A pair of crossed cutter blades 10, having cutting edges 11 are pivotally mounted on the angle end of the bracket support 9, by a pivot bolt 12, passing through the angle bracket support 9 and the cutter blades 10, and held in position by a lock nut 13. The inner ends of the cutter blades 10 are bent upwardly to form angle arm extensions 14 that overlap each other and extend in opposite directions with their ends spaced from each other as shown in Fig. 3.

Mounted within the tubular handle 6 is a reciprocating rod 15, indicated by the dotted lines in Fig. 1, having a cross bar 16 attached thereto by means of a rivet or pin 17. A pair of connecting links 18 is pivotally connected to each arm of the cross bar 16 by means of rivets 19. The other ends of the connecting links 18 are pivotally connected to the angle arm extensions 14 upon the cutter blade by means of rivets or the like. It will be clearly understood that the angle arm extensions 14, and the connecting links 18 are in the same plane as the cross bar arms 16 and the reciprocating rod 15.

Attached to the upper end of the reciprocating rod 15, adjacent the top of the handle 6, is a U-shaped frame 20 which carries a hand grip 21 between its two sides. Substantially midway the ends of the tubular handle 6, is an annular enlargement 22 which serves as a grip while the rod 15 is being reciprocated. A stop pin 23 is carried by one of the cutter blades 10 for engagement with the other cutter blade to limit crossing movement of the blade.

In the operation of the invention, the tubular handle 6 is gripped by one hand of the operator, and the hand grip 21 is engaged by the other hand. The operator holds the tubular handle 6 stationary with one hand while reciprocating motion is applied to the rod 15 by the other hand. When the reciprocating rod 15 is pushed downwardly, the lower end thereof in approaching the pivotal mounting of the blades causes the connecting links 18 to separate the outer ends of the angle extension arms 14 thereby causing the cutter blades 10 to separate. When the reciprocating rod 15 is pulled upwardly, the links 18 pull the angle arm extensions 14 together causing the cutter blades 10 to come together, due to the fact that the cutter blades 10 are crossed and pivoted at 12. This motion constitutes the cutting operation of the device.

It is to be understood that the form of my invention herewith shown and described, is to be taken as a preferred example of the same, and that various changes in the shape, size, and arrangement of parts may be resorted to without departing from the spirit of the invention or the scope of the subjoined claim.

Having thus described my invention, I claim:—

In a cutter of the type described, a tubular handle, a ferrule secured to the lower end of the handle, a bracket arm depending from the ferrule in alinement with the handle, an angle extension at the lower end of the bracket arm traversing the lower end of the handle and spaced therefrom, a pair of cutter blades supported on a single pivot carried by the angle extension with the blades disposed at an angle to the handle, an extension on each cutter blade angularly offset and extending at an angle to the longitudinal axis of the blade with the blade extensions directed in opposite directions and with the ends thereof spaced apart, a rod reciprocably mounted in the handle and projecting beyond the lower end thereof, a hand grip on the upper end of the rod, a cross head attached to the lower end of the rod and link connections between the outer ends of the cross head and the free ends of the blade extensions, said blade extensions, links and cross head lying in the same plane as the handle and opposite the ferrule bracket and said blades being angularly disposed relative thereto.

In testimony whereof I affix my signature.

JOSEPH GLADYSZ.